(12) United States Patent
Elber (10) Patent No.: US 8,508,529 B2
(45) Date of Patent: Aug. 13, 2013

(54) METHODS AND SYSTEMS OF GENERATING A THREE DIMENSIONAL MODEL BASED ON A PLURALITY OF IMAGES

(75) Inventor: Gershon Elber, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 277 days.

(21) Appl. No.: 12/836,611

(22) Filed: Jul. 15, 2010

(65) Prior Publication Data

US 2011/0037762 A1 Feb. 17, 2011

Related U.S. Application Data (60) Provisional application No. 61/233,503, filed on Aug. 13, 2009.

(51) Int. Cl.
*G06T 17/00* (2006.01)
(52) U.S. Cl.
USPC .......................................................... 345/424
(58) Field of Classification Search
None
See application file for complete search history.

(56) References Cited

U.S. PATENT DOCUMENTS

| | | | | |
|---|---|---|---|---|
| 3,988,520 A | * | 10/1976 | Riddle | 428/15 |
| 2008/0002873 A1 | * | 1/2008 | Reeves et al. | 382/133 |

OTHER PUBLICATIONS

Ristroph et al., "Automated hull reconstruction motion tracking (HRMT) applied to sideways maneuvers of free-flying insects", May 2009, The Journal of Experimental Biology, vol. 212, pp. 1324-1335.*
Elber "Rendering With Parallel Stripes", IEEE Computer Graphics and Applications, 21(3): 44-52, May-Jun. 2001.

* cited by examiner

*Primary Examiner* — Kee M Tung
*Assistant Examiner* — Ryan D McCulley (57) ABSTRACT

A method of creating a three dimensional (3D) model which demonstrates two or three images. The method comprises rendering first and second (and optionally third) images, adjust the plurality of primitives along a first axis of the 3D space according to the first image and along a second axis of the 3D space according to the second image (and optionally, and along a third axis of the 3D space according to the third image), and creating a 3D model which demonstrates the first and second (and optionally third) images according to the plurality of adjusted primitives in the 3D space. The first and second (and optionally third) axes are independent view directions.

14 Claims, 9 Drawing Sheets
(3 of 9 Drawing Sheet(s) Filed in Color)

Table 1: Possibilities of 3 × 3 micro-pixels coverage from both the $\vec{X}$ and the $\vec{Y}$ directions.

METHODS AND SYSTEMS OF GENERATING A THREE DIMENSIONAL MODEL BASED ON A PLURALITY OF IMAGES

RELATED APPLICATION

This application claims the benefit of priority under 35 USC 119(e) of U.S. Provisional Patent Application No. 61/233,503 filed on Aug. 13, 2009, the contents of which are incorporated herein by reference in their entirety.

FIELD AND BACKGROUND OF THE INVENTION

The present invention, in some embodiments thereof, relates to models and articles generation and, more particularly, but not exclusively, to methods and system of forming multi dimensional articles and/or creating 3D models based on images.

During the last years various engraving devices have been developed. For example, Cerion™ laser technologies and other corporations manufacture laser systems which engrave glass objects. These systems are easy to transport for use at events and trade shows, facilitating on the fly manufacturing of engraved objects according to received images.

Various methods of forming engraved articles have been developed during Last years. For example, U.S. Pat. No. 6,950,713, filed on Jul. 30, 2003, describes a method for creating a three-dimensional engraving within a solid. A three-dimensional illustration of the solid is scanned into a numerical controller associated with a machining center. The 3D illustration is projected in the solid according to individual depths of cut. The solid is machined according to its project depths. Shading is accomplished according to depth of cut and by immersing the solid into oxide bath and successively abrasively removing a darkened coating according to depth of cut. Powder coating with a thermoset plastic, baking and curing step provides a transparent coating to the solid.

Another example is disclosed in U.S. Patent Application No. 2008/0310747 filed Jun. 18, 2007 which describes method of producing an engraved image on a computer screen includes loading an image to be engraved and converting the image into a high contrast image using at least two colors. The first lighter color is used for the lighter portions of the high contrast image and a darker color is used for the darker portions of the high contrast image. Mixing of the colors is based on the luminance level of the image. A plurality of lines are drawn over the high contrast image with variations in the plurality of lines drawn being a function of the luminance of the underlying image.

SUMMARY OF THE INVENTION

According to some embodiments of the present invention there is provided a method of creating a three dimensional (3D) model which demonstrates two different images from two different directions. The method comprises rendering first and second parallel stripes images, transform a plurality of primitives along a first axis of the 3D space according to the first parallel stripes image and along a second axis of the 3D space according to the second parallel stripes image and creating a 3D model which orthogonally demonstrates the first and second images according to the plurality of transformed primitives in the 3D space. The first and second axes are independent view directions.

Optionally, the method further comprises receiving first and second images and rendering first and second parallel stripes images based thereupon.

Optionally, the method further comprises dispersing the plurality of univariate primitives in a 3D space.

Optionally, the plurality of univariate primitives are selected from a group consisting of: a group of continuous lines, a group of discontinuous lines, a group of curves, and a group of tubes.

Optionally, the first and second axes are orthogonal.

According to some embodiments of the present invention there is provided a device of creating a three dimensional (3D) article having two orthogonal images formed therein. The device comprises an input unit which receives first and second images, a computing unit which computes a 3D model by rendering first and second parallel stripes images respectively based on the first and second images and using the first parallel stripes image to transform a plurality of primitives dispersed in the 3D model along a first axis of the 3D model and using the second parallel stripes image to transform the plurality of primitives along a second axis of the 3D model, and a controller which instructs an article forming unit to engrave an article according to the plurality of transformed primitives in the 3D model, the article orthogonally demonstrating first and second views of the first and second images.

Optionally, the article forming unit is selected from a group consisting of an engraving unit, a laser etching unit, and a layered manufacturing (LM) technologies unit.

Optionally, the input unit comprises a network interface for receiving the first and second images from a remote client terminal.

According to some embodiments of the present invention there is provided a method of creating a three dimensional (3D) model of two images. The method comprises receiving first and second images, setting a plurality of voxels in a 3D space, adjusting a group of the plurality of voxels along a first axis of the 3D space according to intensity values of respective pixels of the first image, adjusting the group along a second axis of the 3D space according to intensity values of respective pixels of the second image, and creating a 3D model according to the plurality of adjusted voxels in the 3D space. The first and second axes are independent view directions.

Optionally, the adjusting is performed by at least one of scaling, tiling micro-voxels, and shading.

Optionally, the method further comprises adjusting the group along a third axis of the 3D space according to intensity values of respective pixels of a third grayscale image, wherein the first, second, and third axes are independent viewing directions.

Optionally, the method further comprises: matching between intensity/color values of pixels of each row of the first image and intensity/color values of respective pixels of each respective row of the second image and arranging each row of the plurality of voxels according to the matching of respective the rows.

Optionally, the method further comprises: matching between intensity/color values of pixels of each column of the first image and intensity/color values of respective pixels of each respective column of the second image and arranging each row of the plurality of voxels according to the matching of respective the rows.

Optionally, the method further comprises generating a 3D article according to the 3D model, the article orthogonally presenting the first and second grayscale images.

According to some embodiments of the present invention there is provided a device of creating a three dimensional (3D) article having at least two images formed therein. The device comprises an input unit which receives first and second images, a computing unit which computes a 3D model by adjusting a plurality of voxels along a first axis of the 3D model according to intensity/color values of respective pixels of the first image and adjusting the plurality of voxels along a second axis of the 3D model according to intensity/color values of respective pixels of the second image, and a controller which instructs an engraving unit to engrave an article according to the plurality of adjusted voxels in the 3D model.

Optionally, the computing unit performs the adjusting by tiling at least one micro-voxel for each adjusted voxel.

According to some embodiments of the present invention there is provided a three dimensional (3D) article having two orthogonal images formed therein. The article comprises a block of transparent material and a plurality of elements, formed in the block so as to orthogonally demonstrate first and second parallel stripes images in a 3D space. The first and second parallel stripes images are automatic transformations of first and second images.

According to some embodiments of the present invention there is provided a method of creating a three dimensional (3D) model of two images. The method comprises receiving first and second images, forming micro-voxels group of plurality of voxels in 3D space, matching between intensities/colors of pixels of the first image and respective the micro-voxels group along a first axis of the 3D space, matching between intensities/colors of pixels of the second image and respective the micro-voxels group along a second axis of the 3D space, and creating a 3D model having a plurality of voxels, according to the plurality of matched micro-voxels. The first and second axes are independent view directions.

Optionally, the method further comprises receiving a third image and matching between intensities/colors of pixels of the third image and respective the micro-voxels group along a third axis of the 3D space, wherein the first, second, and third axes are independent viewing directions.

Optionally, the method further comprises matching between intensity/color values of pixels of each row of the first image and intensity/color values of respective pixels of each respective row of the second image and arranging each respective row of the plurality of voxels according to the matching of respective the rows.

Optionally, the method further comprises matching between intensity/color values of pixels of each column of the first image and intensity/color values of respective pixels of each respective column of the second image and arranging each respective column of the plurality of voxels according to the matching of respective rows.

Optionally, the method further comprises generating a 3D article according to the 3D model, the article orthogonally presenting the first and second grayscale images.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A demonstrate and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to models and articles generation and, more particularly, but not exclusively, to methods and system of forming multi dimensional articles and/or creating 3D models based on images.

According to some embodiments of the present invention there is provided a method and a system of creating a three dimensional (3D) model of an article which demonstrates two images based on parallel strips images.

Optionally, the method is base on color and/or grayscale images which are received from a user and converted to parallel stripes images, such as Victor Vasarely images. Then, univariate primitives are dispersed in a 3D space, such as lines and/or tubes.

The univariate primitives are now curved or maneuvered in two planes according to the parallel stripes images. Optionally, the planes are orthogonal for example; the univariate primitives are transformed, for example bent, along a first axis of the 3D space according to one of the parallel stripes images and along a second axis of the 3D space according to the other parallel stripes image. This allows creating a 3D model which demonstrates, optionally orthogonally, two input images according to the plurality of bent univariate primitives in the 3D space.

According to some embodiments of the present invention there is provided a method and a system of creating a three dimensional (3D) model of an article which demonstrates, optionally orthogonally, two or three images, for example, by adjusting, for example scaling or shading, voxels. As used herein scaling also means tiling one or more micro voxels in one or more voxels, for example by making them visible and/or more visible or marking them as visible and/or more visible.

The method is based on grayscale images which are either received, selected and/or converted from another format, such as color and on a 3D space in which a plurality of voxels are defined. This allows adjusting any voxel along a first axis of the 3D space, for example according to intensity/color values of respective pixels of one of the grayscale images and along an orthogonal axis of the 3D space according to intensity/color values of respective pixels of the other grayscale image.

Now a 3D model may be created according to the adjusted voxels in the 3D space. The model may be used to form an article such as a Sub-Surface Laser Engraving (SSLE) object.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
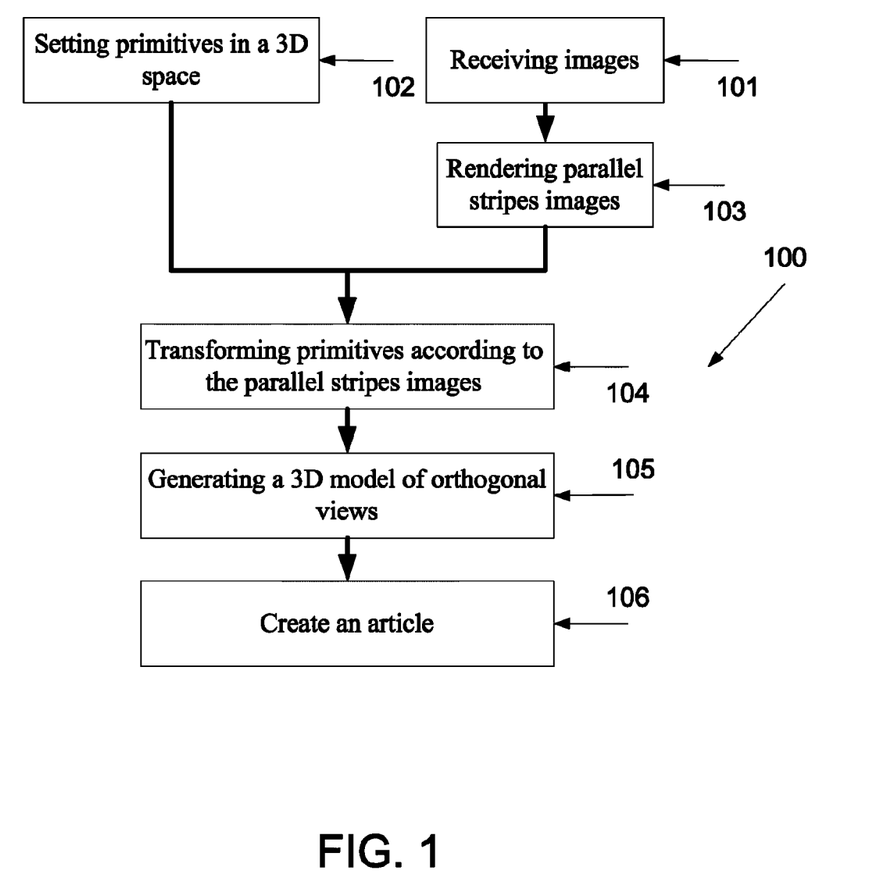
FIG. 1 is a flowchart of a method of creating a 3D model of an article which orthogonally demonstrates two images, according to some embodiments of the present invention.

Reference is now made to FIG. 1, which is a flowchart 100 of a method of creating a three dimensional (3D) model of an article which demonstrates two images, according to some embodiments of the present invention.

First, as shown at 101, two images are selected, received and/or otherwise designated, for example using an interface, such as the input unit which is described below. For the simplicity of the examples provided herein, square images are used. However, these by no means limit the scope of the invention to square images. The images may be of any area, for example square, rectangle, triangular, and/or any polygonal, circular, and/or arcuate shape.

Figure 2A:
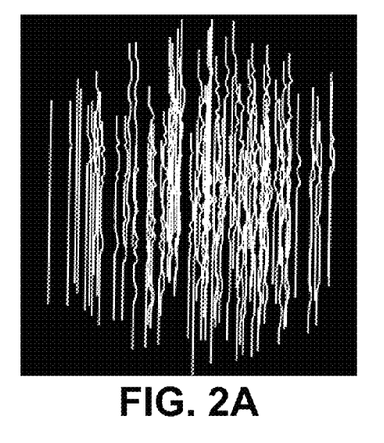
FIGS. 2A and 2B depict a dispersion of a plurality of univariate primitives in a 3D space, according to some embodiments of the present invention.
Figure 2B:
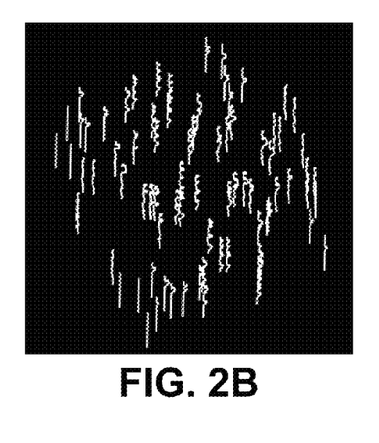

Then, as shown at 102, univariate primitives, for example linear elements, such as a lines or tubes, continuous or discontinuous, are set, for example dispersed, in a 3D space. For example, FIGS. 2A and 2B depict such dispersion. The 3D space optionally represents an inner space of an article, such as a glass object. The 3D space may be defined by X, Y, Z coordinate system where XZ, YZ, and XY represent orthogonal views of the article from points of view which are respectively parallel to the X, Y, and Z axes. The univariate primitives are optionally set randomly in the 3D space. For example, the randomization is based on two independent vectors, $V_1$ and $V_2$, of size N, are generated by random integer values between 0 and N-1. Each random vector may be generated according to the following logical phases:

Input: N: Size of desired vector.

Output: A vector of N random integer values between 0 and N-1.

Algorithm:

1. Build N pairs of (i, f)=(i, Random(0, 1)), i =0, N-1;
2. Sort the pairs based on the r; and
3. Fetch the $i^{th}$ value from each pair, in order, to yield a uniform random distribution of the integers between 0 and N-1.

The random vectors may be created by any coverage of N number in N slots, including in order.

Figure 3A:
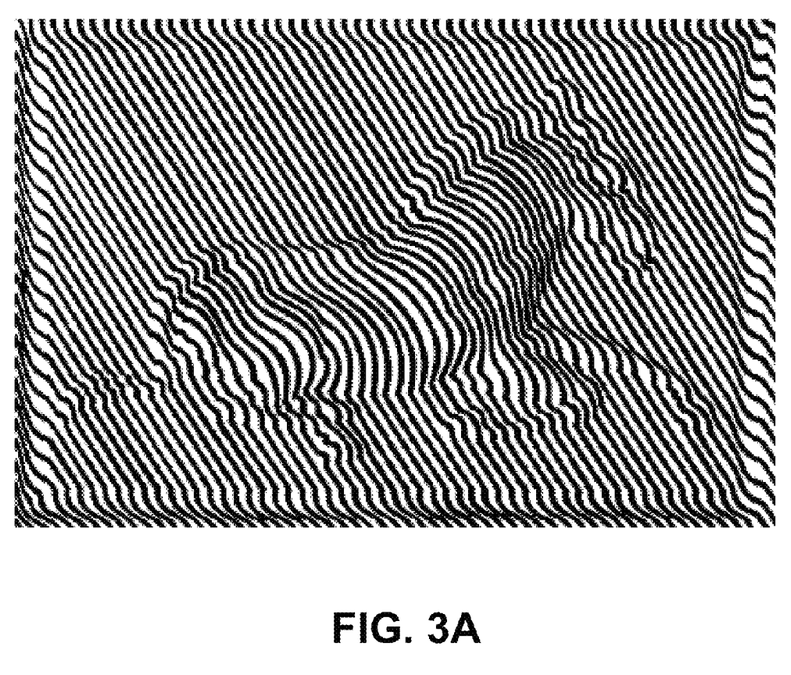
FIG. 3A is exemplary Victor Vasarely image.
Figure 3B:
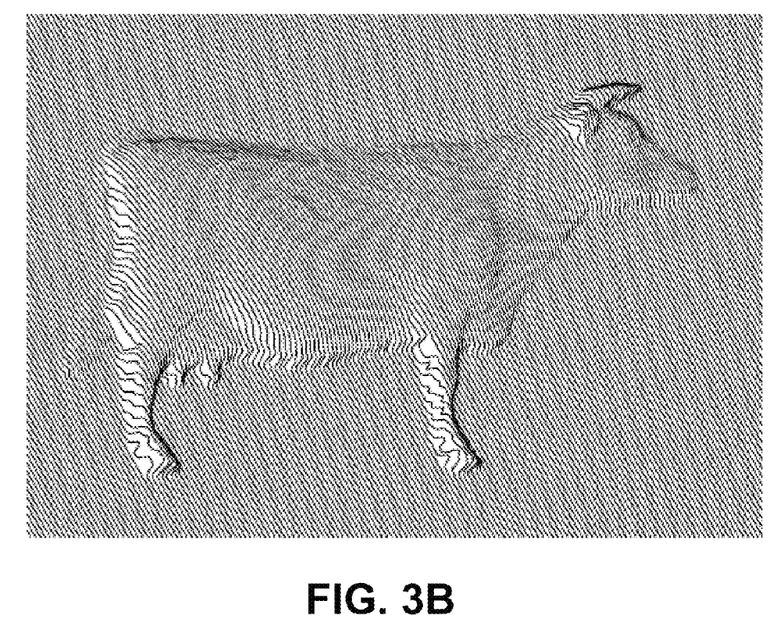
FIG. 3B is synthesized by Gershon Elber. "Rendering with Parallel Stripes." Computer Graphics and Applications, Vol 21, No 3, pp 44-52, May/June 2001.

Now, as shown at 103, a parallel stripes image is rendered for each one of the received images. Optionally, the parallel stripes images are automatically generated as described in Gershon Elber. "Rendering with Parallel Stripes." Computer Graphics and Applications, Vol 21, No 3, pp 44-52, May/June 2001, which is incorporated herein by reference. The parallel stripes image follows the Victor Vasarely line drawing style which conveys depth by shifting parallel lines, for example as depicted in FIG. 3A and in the above Elber reference, for example as depicted in FIG. 3B.

Now, as shown at 104, the parallel stripes images, which are separately generated for each one of the received images, are used to translate the univariate primitives.

Figure 2C:
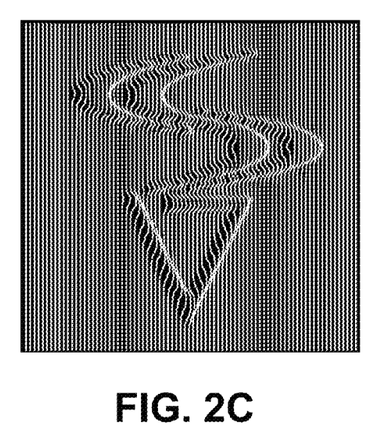
FIGS. 2C and 2D are parallel stripes images which are formed based on the univariate primitives which are respectively depicted in FIGS. 2A-2B, according to some embodiments of the present invention.
Figure 2D:
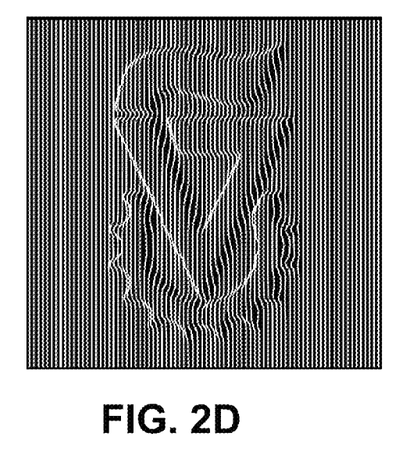

Optionally, one of the parallel stripes images is used to transform the primates along a first axis of the 3D space, for example the X axis, and the second parallel stripes image is used to transform the univariate primitives along a second axis of the 3D space, for example the Y axis. Optionally, all the univariate primitives are linear elements lines which are parallel to one of the axes of the 3D space, for example the Z axis. In such embodiments, the transformation shifts points on the parallel lines in two degrees of freedom. One along the X axis and the other is along the Y axis. This independence may be presented in FIGS. 2C-2D which are images that show a set of univariate primitives, lines, from two different orthogonal views, combining the parallel stripes images of the logos of the Technion's CS department, and the Technion itself. The images are formed based on the univariate primitives which are respectively depicted FIGS. 2A-2B, from a general view.

This allows, as shown at 105, creating, according to the plurality of transformed univariate primitives, a 3D model of two orthogonal views each demonstrate one of the received images. In such a manner, as shown at 106, two new orthogonal parallel stripes images may be formed in a 3D article so as to be separately viewed via orthogonal sides and/or walls of an article generated to include them, for example as described below. The 3D article which orthogonally demonstrates two parallel stripes images is, for example, a hologram or an engraved object, such as, a Sub-Surface Laser Engraving (SSLE) object and the like. The 3D article formed in the process depicted in FIG. 1 have two orthogonal parallel stripes images which are orthogonally engraved or otherwise formed and create drawings that portray depth. It should be noted that though the description herein exemplifies orthogonal views of the received images, non orthogonal views may also be formed. Consider a 3D model comprised of a reconstruction of two images from two orthogonal views and apply a skewing transformation T to M. Clearly T can take the orthogonal views of the M to any views desired.

Figure 4:
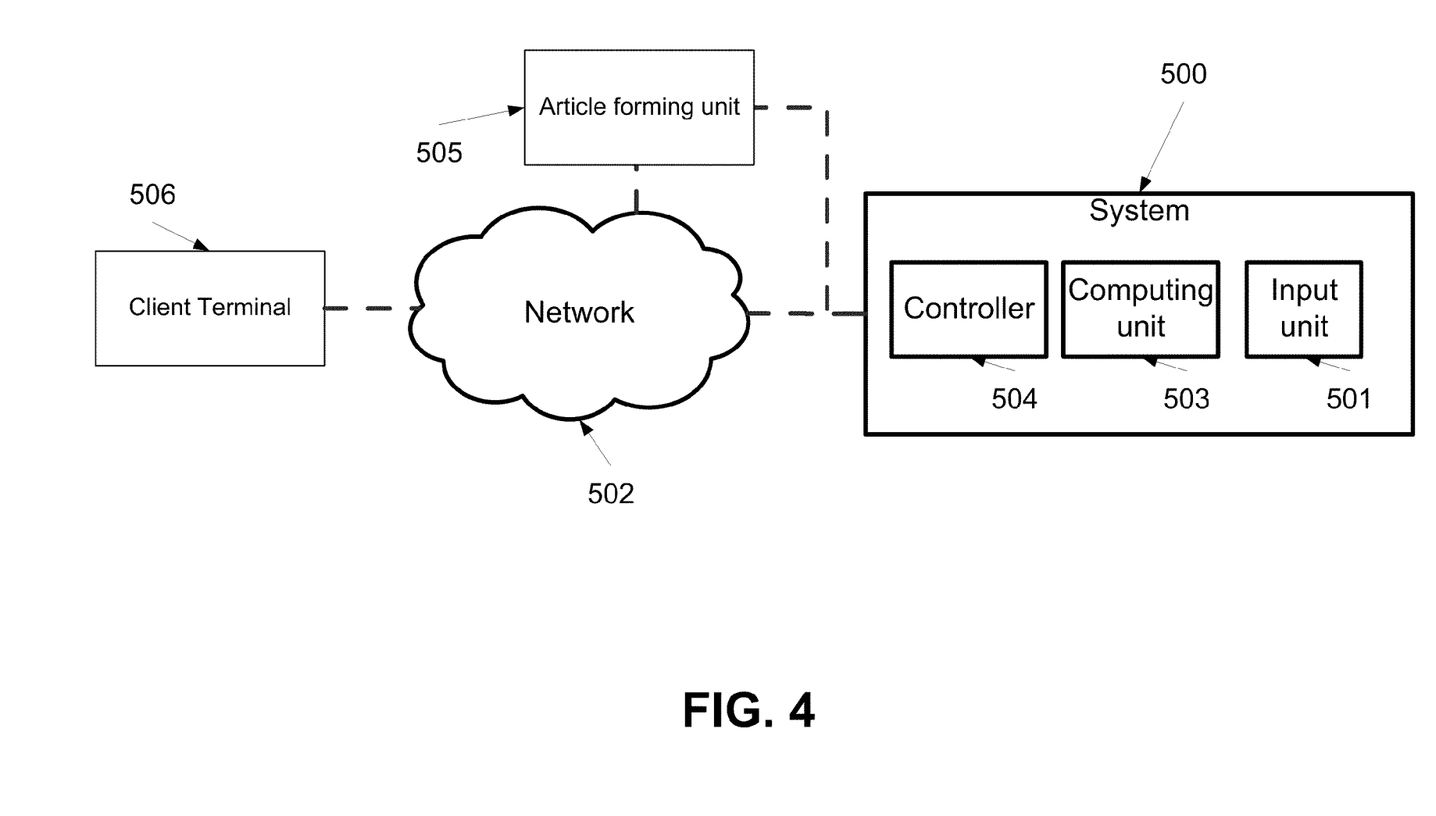
FIG. 4 is a schematic illustration of a system of creating a 3D article having two orthogonal images formed therein, according to some embodiments of the present invention.

Reference is now also made to FIG. 4, which is a schematic illustration of a system 500 of creating a 3D article having two images, optionally orthogonal, formed therein, according to some embodiments of the present invention.

The system 500 is optionally implemented on one or more computing units which interface with an article forming unit 505, such as an engraving machine, laser etching in glass such as Cerion™ and/or computer-aided manufacturing processes in which parts are made in sequential layers, for example layered manufacturing (LM) technologies. The computing units may be a Smartphone, a tablet, a laptop, a desktop, a server and the like. The system 500 includes an input unit 501 which receives images. The input unit may be connected to a network 502, for receiving images over the network, for example in TCP/IP protocol, a media reading drive which may receive the images from a portable tangible medium, such as a hard drive, a CD drive, a DVD drive, a memory chip drive and the like.

The system further includes a computing unit 503 which computes a 3D model by rendering parallel stripes images, each for one of the received images, for example as described above. This allows the computing unit 503 to uses one of the parallel stripes images to transform a plurality of primitives dispersed in a 3D model along a first axis and another of the parallel stripes images to transform the plurality of primitives along a second axis of said 3D model.

The system 500 further includes a controller 504 which instructs the article forming unit 505 to engrave one or more articles according to the plurality of transformed primitives in the 3D model. The instructions may be sent wirelessly and/or via a wired connection. The computing unit 500 may be placed in a remote location, sending the instructions via the network 502.

Optionally, the system 500 is part of a 3D scanner, for example a 3D scanner which is set to provide services to customers in a public place, such as the Cerion™ C-jet set. In such an embodiment, the input unit is connected to a scanner or a camera that scans or captures the received images. The images may be 2D images and/or 3D image, for example taken using a 3D camera, such as InSpeck™ 3D Mega Capturor II 3D camera, such as white halogen light or laser cameras.

Alternatively, the system 500 is set to manufacture the articles which demonstrate the images from images received via the network 502, for example as an online service that provides the engraved articles. In such an embodiment, a user may use a remote client terminal 506, such as a desktop, a tablet, a laptop, and a Smartphone for selecting and/or uploading images which are then used for creating an article with views, optionally orthogonal.

Figure 5:
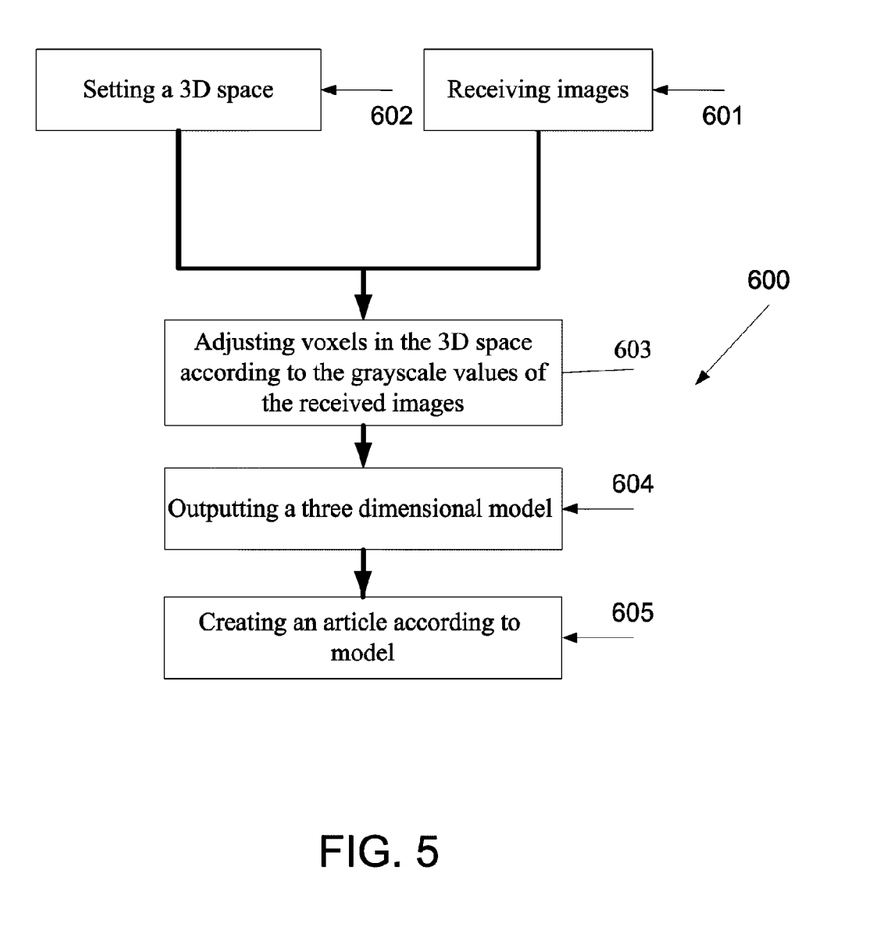
FIG. 5 is a flowchart of a method of creating a 3D model with adjusted, for example scaled, voxels that orthogonally demonstrates two grayscale images, according to some embodiments of the present invention.

Reference is now made to FIG. 5, which is a flowchart 600 of a method of creating a 3D model with adjusted, for example scaled or shaded, voxels that demonstrates two grayscale images, optionally orthogonally, according to some embodiments of the present invention.

In these embodiments, a 3D model of an article which demonstrates two grayscale images with shading may be performed by adjusting primitives, such as voxels in the 3D model, based on the grayscale intensity of the received grayscale images.

Similarly to the process depicted in FIG. 1, and due to the orthogonality of the demonstrated images, the voxels may be thicken or narrowed independently in X-axis and/or in the Y-axis of the 3D model, providing independent shading effect for both demonstrates the two views. The shading effect may also be provided by primitives such as white tubes of varying widths which are set over dark background, or vice versa. Alternatively, the images are depicted using independent dithering along the X and Y axes. In such embodiments, the primitives may have elliptical cross sections that depends on the gray scales at that location in X and Y axes.

First, as shown at 601, and similarly to the described in relation to block 101 of FIG. 1, two images are received. Optionally, the images are grayscale or colored images. In the latter case, each colored image may be converted into a grayscale image using a conversion model, such as International Commission on Illumination (CIE) conversion of grayscale intensity=Red*0.3+Green*0.59+Blue*0.11.

As shown at 602, a 3D space which defines the volume of a 3D model is defined. Optionally, a plurality of voxels are selected, dispersed or assigned in the 3D space. Optionally, the space is a volume of $N^3$ and the number of voxels is $N^2$ so that from the XZ view and from the YZ view all $N^2$ pixels are uniquely covered. For clarity, as used herein, a voxel is a discrete unconnected element which the location thereof is in the 3D space. The voxel can be adjusted, for example scaled or shaded, as in FIG. 7 or can also comprise one or more micro-voxels. For example, a volumetric voxel may include (n×n×n) micro-voxels which may be filled or remain empty. For clarity, filling a micro-voxel means setting a visibility in the ZX, YZ, and XY views of the 3D model.

As shown at 603, the voxels are adjusted along a first axis of said 3D space according to intensity values of respective pixels of one of the received grayscale images and along another axis of the 3D space according to intensity values of respective pixels of the other grayscale image.

For example, blocks 602 and 603 may be performed as follows, where N denotes a number of desired voxels along a dimension of the 3D model.

Input: two received grayscale images, denoted herein as $I_1$ and $I_2$, for example two square shaded images of same size Output: A 3D model having $N^2$ voxels distributed therein mimicking shades for two orthogonal views of the received grayscale images.

For each Z level between 0 and N-1 do

Build two independent vectors, $V_1$ and $V_2$, of size N of random integer values between 0 and N-1, for example as described above;

For i:=0 to N-1 do

Position a unit size voxel B(i, Z) at XYZ coordinates ($V_1$[i], $V_2$[i], Z);

Gray=Intensity of image $I_1$ at coordinate ($V_1$[i], Z) (between 0 and 1), $Gray_2$:=Intensity of image $I_2$ at coordinate ($V_2$[i], Z);

Use $Gray_1$ as local scale in X and $Gray_2$ as local scale in Y of voxel B(i, Z).

Figure 7A:
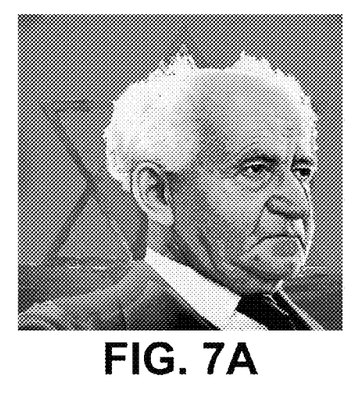
FIGS. 7A and 7B are color images which are converted to gray scale images for a 3D model having $100^2$ voxels, according to some embodiments of the present invention.
Figure 7B:
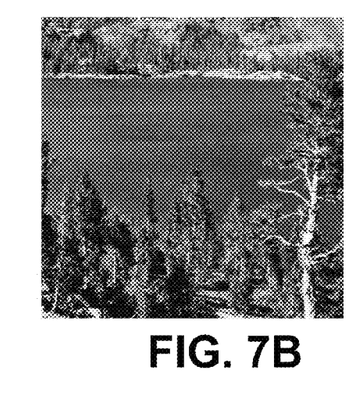
Figure 7C:
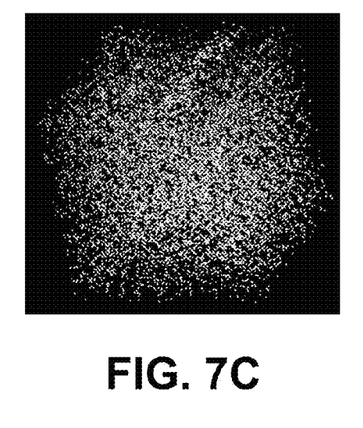
FIG. 7C is a view of the voxels in the space from a general view, according to some embodiments of the present invention.
Figure 7D:
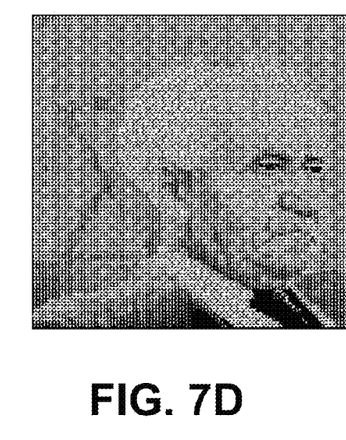
FIGS. 7D and 7E are images of the orthogonal views formed in the 3D model, according to some embodiments of the present invention.
Figure 7E:
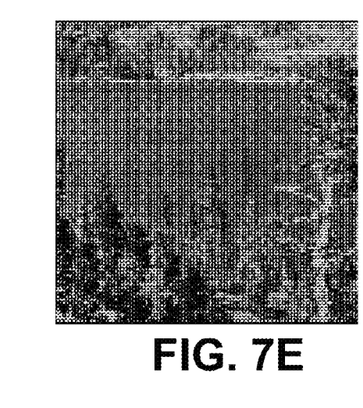
Figure 7F:
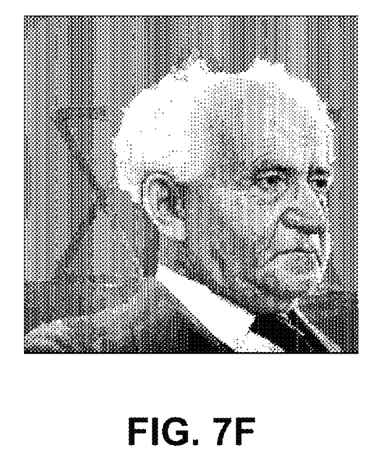
FIGS. 7F and 7G are images of the orthogonal views, based on the images depicted in FIGS. 7A and 7B, formed in a 3D model having box shaped voxels, according to some embodiments of the present invention.
Figure 7G:
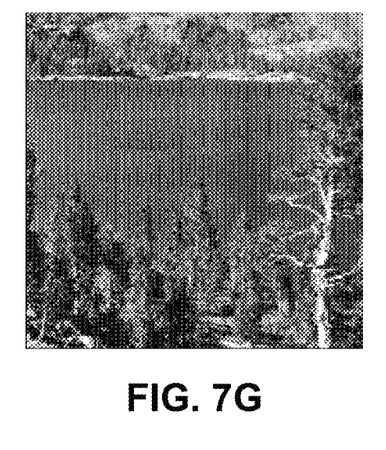
Figure 7H:
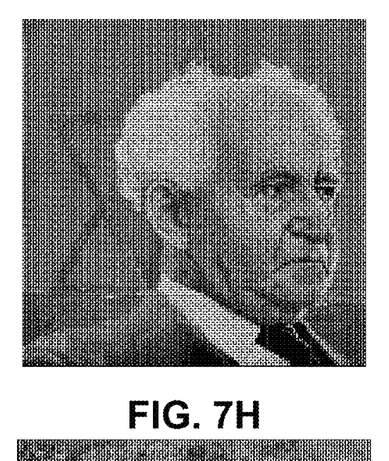
FIGS. 7H and 7I are images of the orthogonal views, based on the images depicted in FIGS. 7A and 7B, formed in a 3D model having ellipsoidal voxels, according to some embodiments of the present invention.
Figure 7I:
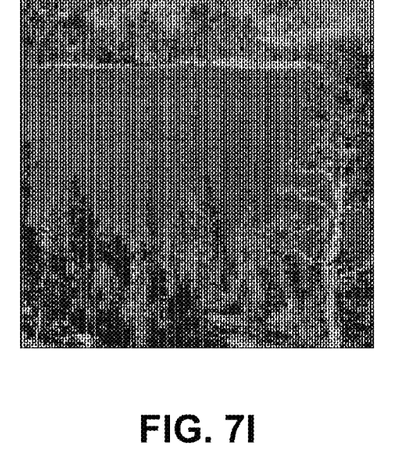
Figure 7J:
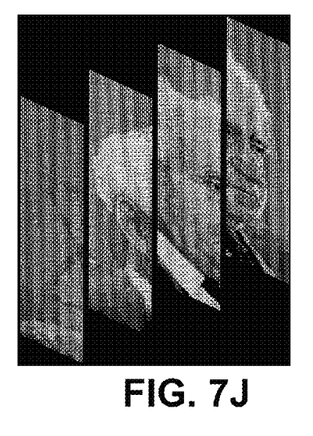
FIG. 7J, is a general view of the 3D model, according to some embodiments of the present invention.

For example, FIGS. 7A and 7B are two color images which are converted to gray scale images for a 3D model having $100^2$ voxels. FIG. 7C is a general view of the $N^2$ voxels in the space. FIGS. 7C and 7D are images of the same $N^2$ voxels from orthogonal views of the 3D model. It should be noted that the shape of the voxels have an effect on the formed views. For example, FIGS. 7F and 7G are images of the orthogonal views formed in a 3D model having box-shaped (scaled cube) voxels and FIGS. 7H and 7I are images of the orthogonal views formed in a 3D model having ellipsoidal (scaled sphere) voxels. The voxels may placed in a number of disjoint planes, for example as shown in FIG. 7J, which is a general view of the 3D model.

Reference is now made to another process of controlling the illumination intensity of the voxels according to the value of pixels of the received images. In this process, the images are dithered to form a correlation between each pixel in the dithered image and a location of one or more voxels which represent the voxel in a 3D model.

In this process, the received images are simultaneously dithered, as precisely as possible, under one or more restrictions which are derived from their intended in the 3D model. As a result, the arrangement of micro-voxels in the 3D model presents at least two images from views, referred to herein as XZ (plane) view and YZ view and possibly XY view. In this embodiment, the received images have $N^2$ pixels, where each pixel has an area of a side of a voxel. For example, if the voxel is a 3×3×3 micro-voxel (n=3), the size of the pixel is 3×3 micro-pixels where a micro-voxel with a side having a micro-pixel size.

Consider two (three) images, each of size $N^2$. An initial 3D model is optionally tiled with $N^2$ voxels so that the $N^2$ voxels are projected to cover all $N^2$ pixels of XZ view and YZ view, and optionally XY view. Each such voxel is formed out of $n^3$ micro-voxels. When projected in XZ view, YZ view, and optionally XY view that voxel yields the desired grayscale of the relevant pixel in the relevant image, if possible.

Now a discrete grayscale intensity of each pixel of a certain image is matched with a discrete grayscale intensity of a pixel in other image. It should be noted, that such a matching may not be possible. When n=3, a voxel of $n^3$=27 micro-voxels may be presented in the 3D model by up to 27 filled micro-voxels so that $n_x$ micro-pixels are seen at the XZ view and $n_y$ micro-pixels are seen at the XY view.

Figure 6A:
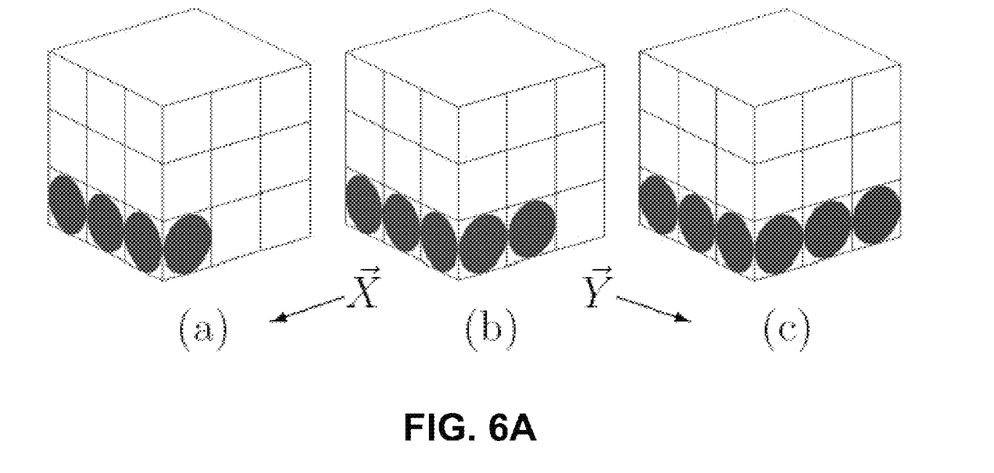
FIGS. 6A-6B are schematic illustration of a cubic voxel having 27 micro-voxels in different states from different views, according to some embodiments of the present invention.
Figure 6B:
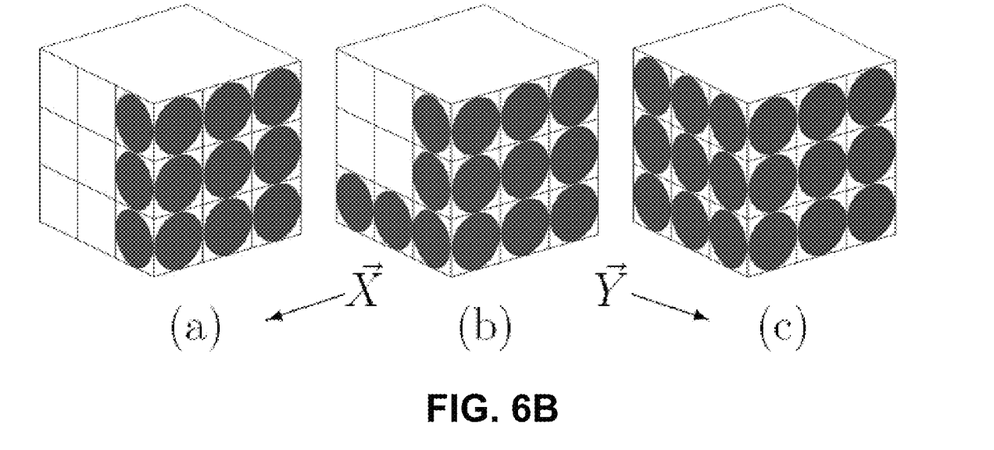

Such an exemplary voxel have a 3×3 pixel wall with 10 possible states wherein different combinations of 9 micro-pixels are filled or not filled from each view (($n_x$, $n_y$, $\in\{0,\ldots,9\}$) where each state can represent a different grayscale intensity. When $n_x$=3, $1 \geq n_y \geq 3$, as can be seen in FIG. 6A. When $n_y$=9 and all nine micro-pixels are filled, $n_x \geq 3$, as can be seen in FIG. 6B.

It should be noted that the system 500 depicted in FIG. 4 may be used to implement any of the processes described above, facilitating the creating of various articles with two or three views, optionally orthogonal, based on selected and/or received images. The implementations of these processes are performed by the computing unit 503 of the system, similarly to the described above, mutatis mutandis.

Figure 8:
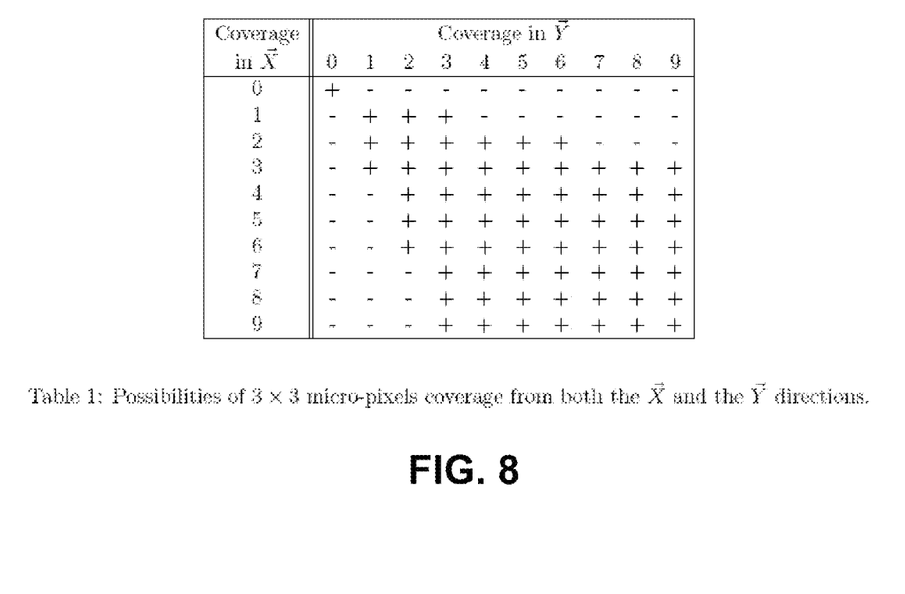
FIG. 8 is an exemplary table which describes all possibilities of micro-pixel coverage of a 3×3 pixel, according to some embodiments of the present invention.

FIG. 8 is an exemplary table which describes all possibilities of micro-voxels' simultaneous coverage for XZ and YZ views. As shown in FIG. 8, a gray level zero in XZ view can be matched only with a gray level zero in YZ view. A gray level three in XZ view may be matched with all possible gray levels in YZ view accept zero. A gray level of nine in XZ view could be matched with a gray level between three and nine the YZ view. In light of the above, an image with a variety of intensities may be matched to another image with another image with a similar variety of intensities, with minimal error. Optionally, the voxels of the 3D model are automatically filled so as to increase the number of voxels having ($n_x$, $n_y$) values which are matching to respective values from the received images. That said, more micro-pixels may be placed. For instance for the case of $n_x=n_y=9$, for n=3, 9 to 27 micro-pixels could be used to fulfill these constraints. Hence, a placement in which the number of used micro-voxels is minimal is selected.

Additionally or alternatively, a match is found between each voxel of a certain row, or a certain column, of one of the images and a voxel of a respective row, or a certain column, of the other of the images. For example, the voxels of the first row in the first image that is set to be demonstrated as an XZ view on the XZ face of a cubical 3D model are matched with voxels of the second row in the second image which is set to be demonstrated as an YZ view on the YZ face. The matching is performed so a voxel having certain grayscale intensity is matched with a matched voxel having similar grayscale intensity, optionally the most similar grayscale intensity. Optionally, the matched voxels are in a common plane that is parallel to one of the walls of the cubical 3D model. This process is repeated for all the voxels, optionally iteratively for each row or column in the 3D model.

Hence, we seek to form the best match between all the pixels in each row or column of the first image to all the pixels in respective row or column of the second image. For example, see FIGS. 9A and 9B, in which $I_x(p)$, $p \in [0, \ldots, K-1]$ denotes all the pixels in the row of the first image, and $I_y(q)$, $q \in [0, \ldots, K-1]$ denotes all the pixels in the row of the second image.

Figure 9A:
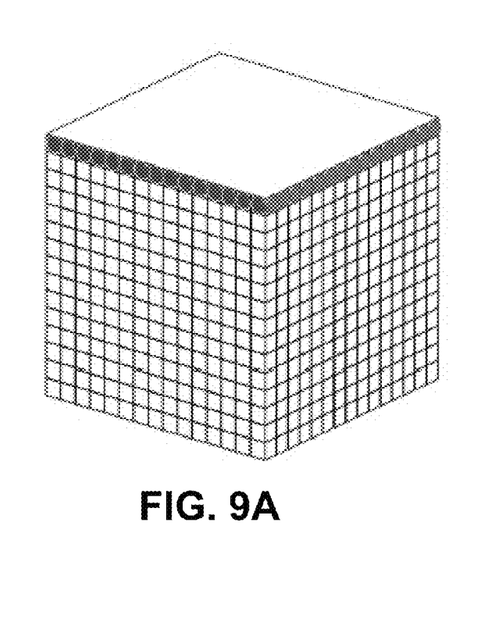
FIGS. 9A-9B are schematic illustrations of cubical 3D model having voxels of the first row from XZ view matched with voxels of the first row from YZ view, according to some embodiments of the present invention.
Figure 9B:
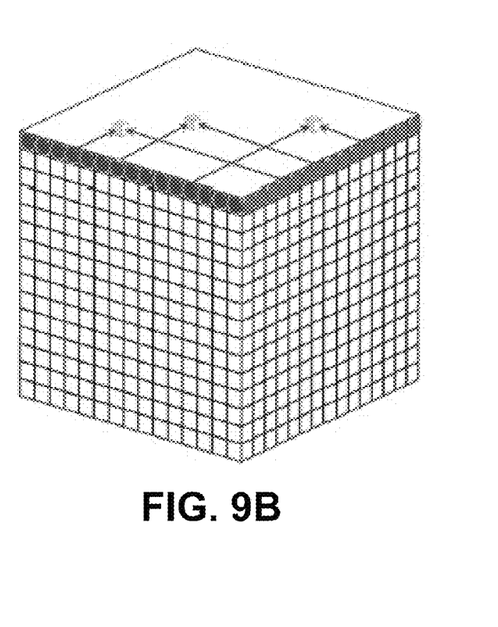

1. Optionally, the matching is performed by enforcing voxels to be in a diagonal plane where p=q and $I_x(p)$ is matched with $I_y(p)$.

2. Optionally, the matching is performed while allowing complete freedom in matching $I_x(p)$ to any pixel $I_y(q)$. This freedom reduces the problem to a bipartite graph matching with at least one of the following constraints:

$I_x(p_1)(I_y(q_1))$ is matched to precisely one pixel $I_y(q_2)$ ($I_x(p_2)$); and $I_x(p_1)(I_y(q_1))$ is matched to one or more pixels from $I_y(I_x)$.

3. Optionally, when both constrains are applied, $I_x(p)$ is matched only with $I_y(q)$, such that |p-q|<b, where b is a bound on the deviation. The advantage of this third alternative is that the 3D models can still be bound to an almost diagonal plane and hence will be almost planar, yet the restrictions on the selection of matching pixels is reduced. It should be noted that when b=1 only the first restriction applies and for b>n only the second restriction applies According to some embodiments of the present invention, a 3D model that incorporates three images which may be demonstrated from 3 views, optionally orthogonal, is formed.

The extension of the aforementioned process for combining 2 images to three images is conceptually simple. As described above, for two images, an approximate solution that may be corrected via some error diffusion scheme is provided. When three images are received, $N^2$ voxels are adjusted and/or dithered in the 3D cube model so that they cover $N^2$ pixels of images which are formed to be demonstrated in the XY, YZ, and XZ views of the 3D model.

Optionally, a tripartite graph matching is applied, seeking the best solution that could be found. It should be noted that error diffusions becomes a global 3D modeling problem where as in the two images case we could solve for one row and propagate the errors to the next row.

So far, a single voxel was used to cover two (or three) pixels from orthogonal views. However, a voxel, with ($3 \times 3 \times 3$) micro-voxels (n=3), with a desired coverage $I_x(p_1) = n_x$ can be split into two voxels, one behind the other from the XZ view so they provide the necessary coverage of $I_y(q_1) = n_{y1}$ and $I_y(q_2) = n_{y2}$, having two micro-voxels, in the voxel($p_1$, $q_1$) and voxel ($p_1$, $q_2$). This decomposition could further optimize the overall resulting 3D model, at the expense of having more than $N^2$ voxels in the 3D model.

Given a pair (or a triplet) of necessary coverage ($n_x$, $n_y$) (or ($n_x$, $n_y$, $n_z$)), there is more than one solution of micro-voxels placements. Moreover, there is more than one solution that is minimal in the number of micro-voxels needed, max($n_x$, $n_y$) (or max($n_x$, $n_y$, $n_z$)). Arrangements of micro-voxels that reduces patterns, such as moire patterns, may be sought as is not in traditional dithering.

According to some embodiments of the present invention, color is supported in the manufacturing process, for example when the engraving unit is a colored layered manufacturing system, such as ZPrinter® 650 of ZCorp™. In such an embodiment, each voxel may be gradually painted to convey from X the proper color from image $I_1$ and from Y the proper color from image $I_2$. Moreover, the need to have square, similarly sized, images is artificial for the simplicity of the algorithm and could be easily relaxed.

Now, as shown at 604, a 3D model which is based on the adjusted voxels in the 3D space is created and outputted.

This allows, as shown at 605, creating, according to the adjusted voxels, a 3D model in the 3D space. In such a manner, two orthogonal shading emulating views are formed in the 3D space so as to be separately viewed via orthogonal sides and/or walls of an article generated to include them, for example as described below. The 3D model may be used for creating a 3D article, for example an engraved object, a hologram, a SSLE object and the like.

It should be noted that the voxels may be shaped in differently. For example, voxels may be elliptical, polyhedral, spherical, cubical, and/or circular.

An ellipsoidal voxel can cover less area than a box-line voxel, when confined to the voxel's domain. As a result, a contrast that may be gained using polyhedral voxels, for example as shown in FIGS. 7F-7G is higher in comparison to when spherical voxels are used, for example as shown in FIGS. 7H-7I.

The adjusted voxels uniquely cover the orthogonal views. While any geometric entities could be used as covering primitives, every pixel in either input images is optionally covered by a single primitive. While entities can stretch over more than a single pixel (i.e. lines), the coverage should allow for control over each individual pixel's intensity.

It is expected that during the life of a patent maturing from this application many relevant systems and methods will be developed and the scope of the term a computing unit, a display, an article, and an engraving unit is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of creating a three dimensional (3D) model of two images, comprising:
   receiving first and second images of different objects;
   setting a plurality of voxels in a 3D space;
   adjusting a group of said plurality of voxels along a first axis of said 3D space according to intensity values of respective pixels of said first image;
   adjusting said group along a second axis of said 3D space according to intensity values of respective pixels of said second image; and
   creating a 3D model according to said plurality of adjusted voxels in said 3D space;
   wherein said first and second axes are independent view directions, and wherein said first object image is seen from said first view direction and said second object image is seen from said second view direction.

2. The method of claim 1, wherein said adjusting is performed by at least one of scaling, tiling micro-voxels, and shading.

3. The method of claim 1, further comprising adjusting said group along a third axis of said 3D space according to intensity values of respective pixels of a third grayscale image, wherein said first, second, and third axes are independent viewing directions, and wherein said setting further comprising setting said voxels in a 3D space such that said first, second and third viewing directions are covered with said plurality of voxels.

4. The method of claim 1, further comprising: matching between intensity/color values of pixels of each row of said first image and intensity/color values of respective pixels of each respective row of said second image and arranging each row of said plurality of voxels according to said matching of respective said rows.

5. The method of claim 1, further comprising: matching between intensity/color values of pixels of each column of said first image and intensity/color values of respective pixels of each respective column of said second image and arranging each column of said plurality of voxels according to said matching of respective said columns.

6. The method of claim 1, further comprising generating a 3D article according to said 3D model, said article orthogonally presenting said first and second images.

7. The method of claim 1, wherein said first and second object images are grayscale images.

8. A device of creating a three dimensional (3) article having at least two images formed therein, comprising:
   an input unit which receives first and second images of different objects;
   a computing unit which computes a 3D model by adjusting a plurality of voxels along a first axis of said 3D model according to intensity/color values of respective pixels of said first image and adjusting said plurality of voxels along a second axis of said 3D model according to intensity/color values of respective pixels of said second image; and
   a controller which instructs an engraving unit to engrave an article according to said plurality of adjusted voxels in said 3D model;
   wherein said first and second axes are independent view directions, and wherein said first object image is seen from said first view direction and said second object image is seen from said second view direction.

9. The device of claim 8, wherein said computing unit performs said adjusting by tiling at least one micro-voxel for each said adjusted voxel.

10. A method of creating a three dimensional (3D) model of two images, comprising:
    receiving first and second images of different objects;
    forming a group of micro-voxels for each of a plurality of voxels in 3D space;
    matching between intensities/colors of pixels of said first image and respective said micro-voxels group along a first axis of said 3D space;
    matching between intensities/colors of pixels of said second image and respective said micro-voxels group along a second axis of said 3D space; and
    creating a 3D model having a plurality of voxels, according to said plurality of matched micro-voxels;
    wherein said first and second axes are independent view directions, and wherein said first object image is seen from said first view direction and said second object image is seen from said second view direction.

11. The method of claim 10, further comprising receiving a third image and matching between intensities/colors of pixels of said third image and respective said micro-voxels group along a third axis of said 3D space, wherein said first, second, and third axes are independent viewing directions, and wherein said forming further comprising setting said voxels in 3D space such that said first, second and third viewing directions are covered with said plurality of voxels.

12. The method of claim 10, further comprising: matching between intensity/color values of pixels of each row of said first image and intensity/color values of respective pixels of each respective row of said second image and arranging each respective row of said plurality of voxels according to said matching of respective said rows.

13. The method of claim 10, further comprising: matching between intensity/color values of pixels of each column of said first image and intensity/color values of respective pixels of each respective column of said second image and arranging each respective column of said plurality of voxels according to said matching of respective said columns.

14. The method of claim 10, further comprising generating a 3D article according to said 3D model, said article orthogonally presenting said first and second images.

* * * * *